US010576797B2

(12) United States Patent
Ijima et al.

(10) Patent No.: US 10,576,797 B2
(45) Date of Patent: Mar. 3, 2020

(54) TIRE PRESSURE DETECTION APPARATUS

(71) Applicant: DENSO CORPORATION, Kariya, Aichi-pref. (JP)

(72) Inventors: Ryoichi Ijima, Kariya (JP); Nobuya Watabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 534 days.

(21) Appl. No.: 15/326,152

(22) PCT Filed: Jul. 7, 2015

(86) PCT No.: PCT/JP2015/003415
§ 371 (c)(1),
(2) Date: Jan. 13, 2017

(87) PCT Pub. No.: WO2016/009615
PCT Pub. Date: Jan. 21, 2016

(65) Prior Publication Data
US 2017/0203620 A1 Jul. 20, 2017

(30) Foreign Application Priority Data

Jul. 18, 2014 (JP) ................................. 2014-147969

(51) Int. Cl.
*B60C 23/04* (2006.01)
(52) U.S. Cl.
CPC ...... *B60C 23/0488* (2013.01); *B60C 23/0415* (2013.01); *B60C 23/0459* (2013.01); *B60C 23/0474* (2013.01); *B60C 23/0489* (2013.01)

(58) Field of Classification Search
CPC ............ B60C 23/0488; B60C 23/0415; B60C 23/0474
See application file for complete search history.

(56) References Cited

U.S. PATENT DOCUMENTS

| 2008/0030314 A1* | 2/2008 | Watabe | B60C 23/0459 |
| | | | 340/447 |
| 2011/0105957 A1* | 5/2011 | Kourogi | G01C 21/26 |
| | | | 600/595 |

FOREIGN PATENT DOCUMENTS

| JP | 2006227019 A | 8/2006 |
| JP | 2008117423 A | 5/2008 |
| JP | 4752661 B2 | 8/2011 |
| JP | 2012018075 A | 1/2012 |

(Continued)

*Primary Examiner* — Michael J Dalbo
(74) *Attorney, Agent, or Firm* — Harness, Dickey & Pierce, P.L.C.

(57) ABSTRACT

A tire pressure detection apparatus includes: a transmitter at each of a plurality of wheels with a tire; and a receiver at a vehicle body. The transmitter has: a sensing device having a pressure sensor outputting a detection signal related to a tire pressure of each of the plurality of wheels and an acceleration sensor detecting an acceleration including a centrifugal acceleration caused by rotation of the wheel and a gravitational acceleration; a first controller performing signal processing on the detection signal of the pressure sensor and creating a frame storing data related to the tire pressure; and a radio wave transmitter transmitting the frame. The receiver has: a radio wave receiver receiving the frame; and a second controller detecting a tire pressure based on the data related to the tire pressure stored in the received frame.

7 Claims, 7 Drawing Sheets

(56) References Cited

FOREIGN PATENT DOCUMENTS

JP          2012179928 A  *  9/2012
WO    WO-2013111910 A1  *  8/2013   ......... B60C 23/0416

* cited by examiner

TIRE PRESSURE DETECTION APPARATUS

CROSS REFERENCE TO RELATED APPLICATIONS

This application is a U.S. National Phase Application under 35 U.S.C. 371 of International Application No. PCT/JP2015/003415 filed on Jul. 7, 2015 and published in Japanese as WO 2016/009615 A1 on Jan. 21, 2016. This application is based on and claims the benefit of priority from Japanese Patent Application No. 2014-147969 filed on Jul. 18, 2014. The entire disclosures of all of the above applications are incorporated herein by reference.

TECHNICAL FIELD

The present disclosure relates to a direct type tire pressure detection apparatus that detects tire pressure, wherein transmitters with pressure sensors are attached to wheels to which tires are mounted, and detection results of the pressure sensors transmitted from the transmitters are received by a receiver attached to the vehicle body side.

BACKGROUND ART

As one of conventional tire pressure detection apparatuses, a direct type is known. A tire pressure detection apparatus of this type includes transmitters each provided with a sensor such as a pressure sensor and directly attached to the wheel side, where tires are mounted. An antenna and a receiver are provided to the vehicle body side. When detection signals from the sensors are wirelessly transmitted from the transmitters, the detection signals are received by the receiver via the antenna, based on which the tire pressure is monitored.

In such a tire pressure detection apparatus, when the vehicle is detected to be running, it is desired that information regarding tire pressure be wirelessly transmitted from the transmitters to the receiver, irrespective of whether there is an abnormality in the tire pressure. Detection of a vehicle running state is achieved based on detection signals from acceleration sensors installed in the transmitters. When an acceleration based on which the vehicle is assumed to be running is detected, the transmitters wirelessly transmit the information regarding tire pressure.

However, with a conventional tire pressure detection apparatus, a running state of the vehicle cannot be detected unless the vehicle speed reaches a certain level (for example, 30 km/h or more) due to limitations such as large measurement errors in the acceleration sensors equipped in the transmitters, because of which detection of a vehicle speed is difficult at low speed.

Patent Literature 1 proposes a tire pressure detection apparatus capable of detecting a running state of the vehicle at lower speed. In this tire pressure detection apparatus, a variance value of measured values of acceleration when the vehicle is at a standstill, i.e., when the tire is not rotating, is used as a value of the standstill state, and the vehicle is determined to be running when this variance value is increased. With this configuration, a running state can be detected at lower speed, and the information regarding tire pressure can be wirelessly transmitted from the transmitters at lower speed.

However, since the transmitters are attached to the wheels in direct type tire pressure detection apparatuses, and powered by small batteries provided inside the transmitters, an increase in power consumption needs to be minimized. In the tire pressure detection apparatus described in Patent Literature 1, in particular, the number of measurements is increased in order to detect the running state of the vehicle at low speed, so that the power consumption is increased.

PRIOR ART LITERATURES

Patent Literature

Patent Literature 1: JP-4752661B

SUMMARY OF INVENTION

An object of the present disclosure is to provide a tire pressure detection apparatus capable of transmitting information on tire pressure from transmitters even at low speed, while avoiding an increase in power consumption.

A tire pressure detection apparatus according to a first aspect of the present disclosure includes: a transmitter that is arranged at each of a plurality of wheels with a tire and has a sensing device with a pressure sensor, which outputs a detection signal related to a tire pressure of each of the plurality of wheels and an acceleration sensor, which detects an acceleration including a centrifugal acceleration caused by rotation of the wheel and a gravitational acceleration, a first controller that performs signal processing on the detection signal of the pressure sensor and creates a frame, which stores data related to the tire pressure, and a radio wave transmitter that transmits the frame; and a receiver that is arranged at a vehicle body and has a radio wave receiver that receives the frame, and a second controller that detects a tire pressure based on the data related to the tire pressure stored in the received frame. The first controller includes: a computing device that measures the acceleration with a measurement cycle, which is set at a predetermined value, based on the detection signal of the acceleration sensor to compute measured values, and calculates a variance value of the measured values; a measurement cycle setting device that sets the measurement cycle to a shorter value as a vehicle speed assumed based on the measured values increases; a running state determination device that carries out a running state determination to determine that the vehicle is running when the variance value of measured values of acceleration exceeds a predetermined variance threshold; and a transmission device that initiates a frame transmission from the radio wave transmitter when the running state determination is carried out.

A tire pressure detection apparatus according to a second aspect of the present disclosure includes: a transmitter that is arranged at each of a plurality of wheels with a tire and has a sensing device with a pressure sensor, which outputs a detection signal related to a tire pressure of each of the plurality of wheels and an acceleration sensor, which detects an acceleration including a centrifugal acceleration caused by rotation of the wheel and a gravitational acceleration, a first controller that performs signal processing on the detection signal of the pressure sensor and creates a frame, which stores data related to the tire pressure, and a radio wave transmitter that transmits the frame; and a receiver that is arranged at a vehicle body and has a radio wave receiver that receives the frame and a second controller that detects a tire pressure based on the data related to the tire pressure stored in the received frame. The first controller includes: a setting device that sets a measurement cycle for measuring the acceleration based on the detection signal of the acceleration sensor, and sets a variance threshold to be compared with a variance value of the measured values of acceleration; a computing device that calculates a variance value of the measured values of acceleration measured with the measurement cycle; a running state determination device that carries out a running state determination to determine whether the vehicle is at a standstill or running by determining whether the variance value exceeds the variance threshold and to determine that the vehicle is running when the variance value of the measured values of acceleration exceeds the variance threshold; and a transmission device that initiates a frame transmission from the radio wave transmitter when the running state determination is carried out.

In the tire pressure detection apparatus according to the first and second aspects of the present disclosure, the cycle of measurement of acceleration is set relatively long when the vehicle is at a standstill, and as the possibility that the vehicle is running increases, the measurement cycle is set relatively short in accordance with an assumed vehicle speed. With this configuration, the measurement cycle can be optimized in accordance with the vehicle speed, in other words, the rotation speed of the tire, so that the variation in centrifugal acceleration that occurs with the tire rotation can be correctly detected. A running state is detected with a reduced amount of calculation at low speed, while the measurement cycle is shortened at high speed to prevent erroneous detection of a standstill state, and thus the tire pressure detection apparatus is capable of detecting a running state at low speed while minimizing power consumption.

EMBODIMENTS FOR CARRYING OUT INVENTION

Hereinafter, embodiments of the present disclosure will be described with reference to the drawings.

First Embodiment

A first embodiment of the present disclosure will be described with reference to FIG. 1 to FIG. 6. The upward direction, downward direction, and left-right direction in the paper plane of FIG. 1 correspond to a forward direction, rearward direction, and left-right direction of a vehicle 1, respectively.

Figure 1:
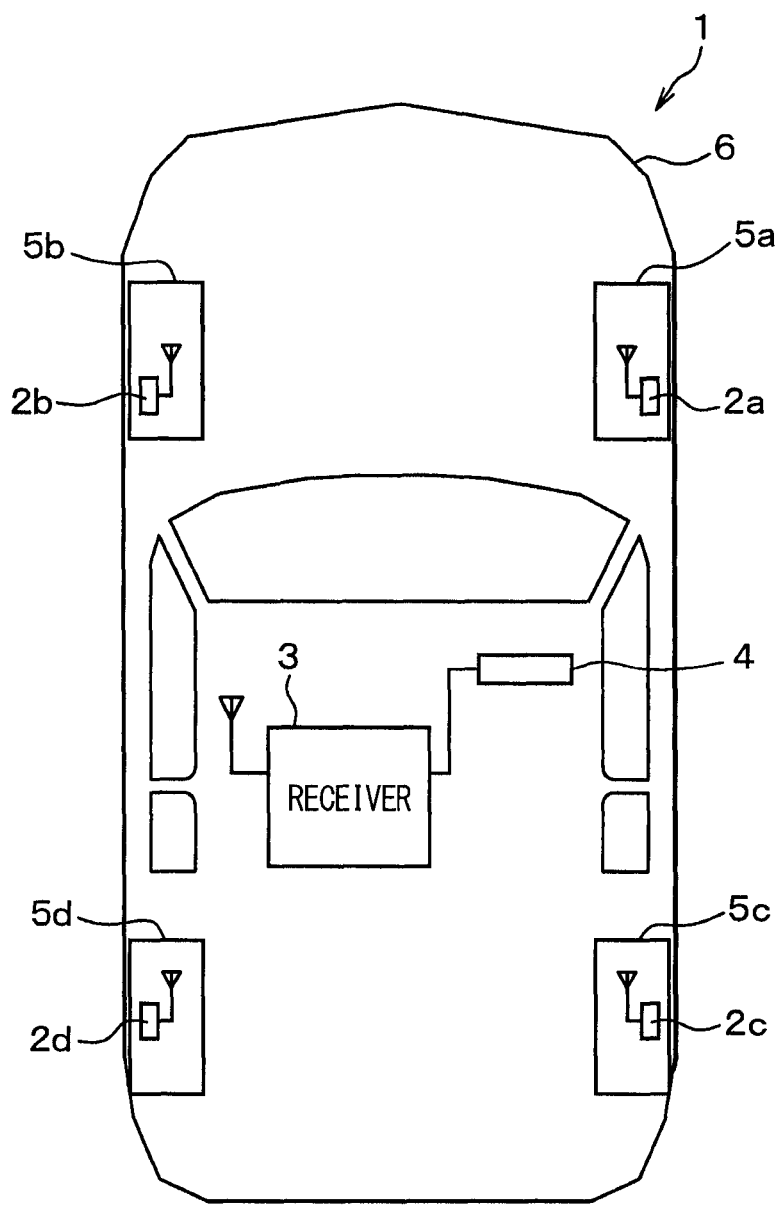
FIG. 1 is a diagram illustrating a schematic configuration of a tire pressure detection apparatus according to a first embodiment of the present disclosure.

A tire pressure detection apparatus shown in FIG. 1 is mounted on the vehicle 1 and configured to include transmitters 2a to 2d, a receiver 3, and an indicator 4.

As shown in FIG. 1, the transmitters 2a to 2d are respectively attached to wheels 5a to 5d of the vehicle 1 to detect pressure of tires mounted to the wheels 5a to 5d and to transmit frames storing data of detection signals indicative of the detection results. The receiver 3 mounted to the vehicle body 6 side of the vehicle 1 receives the frames transmitted from the transmitters 2a to 2d, and performs various processes and operations based on the detection signals stored in the frames to monitor the tire pressure.

Figure 2A:
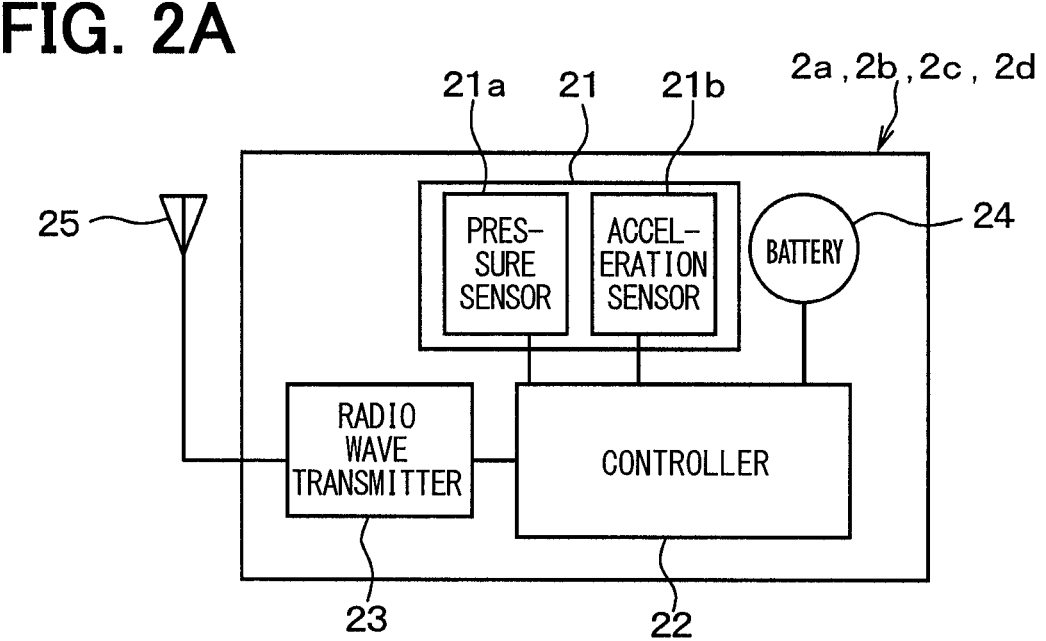
FIG. 2A is a diagram illustrating a block configuration of transmitters.

As shown in FIG. 2A, the transmitters 2a to 2d are each configured to include a sensing device 21, a controller (first controller) 22, a radio wave transmitter 23, a battery 24, and an antenna 25. Various parts are driven by the electric power supplied by the battery 24.

Figure 3:
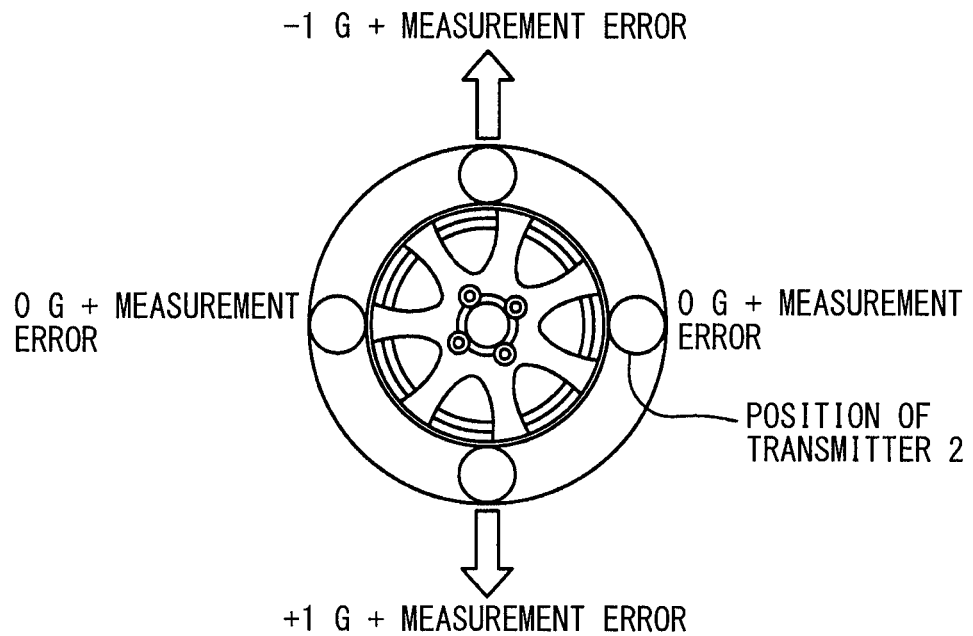
FIG. 3 is a diagram illustrating a relationship between positions of the transmitters inside a tire and measured values of an acceleration sensor.

The sensing device 21 is configured to include a diaphragm type pressure sensor 21a and an acceleration sensor 21b, for example, so that it outputs detection signals in accordance with tire pressure, and detection signals in accordance with accelerations, and sends the detection signals to the controller 22. The acceleration sensor 21b is disposed such as to be able to detect accelerations that vary with the rotation of the tire. For example, the acceleration sensor 21b is disposed such as to detect a radial acceleration of the wheel, or a tangential acceleration of the wheel. In the present embodiment, the acceleration sensor 21b is disposed such as to detect the radial acceleration of the wheel, wherein the outward radial acceleration is indicated with a positive value, and the inward radial acceleration is indicated with a negative value. Therefore, when the tires are not rotating and the transmitters 2a to 2d are located below the wheels, the detection signal of the acceleration sensor 21b indicates +1 G as shown in FIG. 3 as the acceleration, because of a gravitational acceleration added radially outward. When the transmitters 2a to 2d are located above the wheels, the gravitational acceleration is added radially inward, so that the acceleration will be −1 G. When the transmitters are located on the lateral side of the wheels, i.e., at the same height as the axles, the acceleration will be 0 G, as the gravitational acceleration acts orthogonally to the direction of detecting the acceleration. When the tires rotate, the centrifugal acceleration due to the rotation will be included in the acceleration represented by the detection signal of the acceleration sensor 21b. Although not shown, the sensing device 21 also includes a temperature sensor, so that detection signals in accordance with the temperatures inside the tires are also sent to the controller 22.

The controller 22 is configured with a known microcomputer that includes a CPU, a ROM, a RAM, an I/O, and the like, and executes predetermined processes in accordance with a program stored in a memory such as a ROM. The memory inside the controller 22 stores ID information containing ID data intrinsic to each of the transmitters 2a to 2d for specifying the transmitters, and ID data intrinsic to the vehicle for specifying the vehicle.

The controller 22 receives the detection signals output from the sensing device 21, processes or changes the signals as required to produce data indicative of detection results, stores the data with the ID information of the transmitters 2a to 2d within a frame, and sends this frame to the radio wave transmitter 23. The controller 22 operates in a periodic transmission mode and in a running state determination mode, and transmits a frame based on each mode.

The periodic transmission mode is a mode for sending a frame at regular intervals for every predetermined periodic transmission cycle. The frame transmission cycle takes into account the amount of power consumption of the battery 24. Since it can be determined whether the vehicle is running or at a standstill, based on detection signals of the acceleration sensor 21b, the periodic transmission cycle when the vehicle is running is made different from, i.e., shorter than, that when the vehicle is at a standstill. The periodic transmission cycle may be changed as required in accordance with the tire condition or the running condition of the vehicle, e.g., frames may be transmitted with a shorter periodic transmission cycle when the tire pressure is reduced. The operation in this periodic transmission mode is as has been practiced conventionally and will not be described here.

The running state determination mode is a mode for transmitting a frame at the time when a determination is made that the state of the vehicle at a standstill has changed to a running state (hereinafter referred to as "running state determination"). As mentioned above, when the driver starts to drive the vehicle, it is important to wirelessly transmit frames from the transmitters 2a to 2d to send the detection results of the tire pressure to the receiver 3 side at lower speed. This is why frame transmission is initiated when a running state is determined, separately from the periodic transmission in the periodic transmission mode. The process of determining a running state in this running state determination mode is the characteristic feature of the present disclosure and will be described in more detail later.

The radio wave transmitter 23 serves the function as an output device that transmits the frames sent from the controller 22 to the receiver 3 as RF waves via the antenna 25. The process of sending signals from the controller 22 to the radio wave transmitter 23 is set to be executed in accordance with the program mentioned above for every predetermined periodic transmission and running state determination. More specifically, since it cannot be determined on the transmitters 2a to 2d side whether the ignition switch (IG) is turned on or off, frame transmission is initiated basically for every predetermined periodic transmission cycle, and in addition, frame transmission is initiated also when a running state is determined.

The battery 24 supplies power to the sensing device 21 and the controller 22. With the power supplied from this battery 24, the sensing device 21 collects data on the tire pressure, and the controller 22 executes various operations.

The transmitters 2a to 2d thus configured are attached to air injection valves of the respective wheels 5a to 5d, for example, such that the sensing device 21 is exposed inside the tire. Thus the transmitters 2a to 2d detect the tire pressure of corresponding wheels, and send frames at every predetermined cycle via the antenna 25 provided in each of the transmitters 2a to 2d.

Figure 2B:
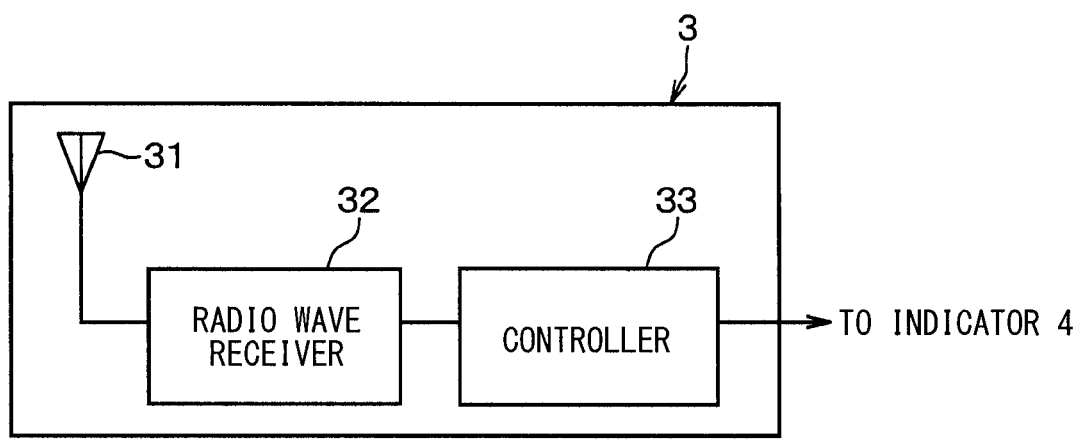
FIG. 2B is a diagram illustrating a block configuration of a receiver.

As shown in FIG. 2B, the receiver 3 operates by the power supplied from a battery or the like, and is configured to include an antenna 31, a radio wave receiver 32, and a controller 33.

The antenna 31 is for receiving the frames sent from each of the transmitters 2a to 2d. In the present embodiment, the antenna 31 is a single common antenna that collectively receives the frames sent from each of the transmitters 2a to 2d, and fixed to the vehicle body 6.

The radio wave receiver 32 serves the function as an input device that inputs the frames sent from each of the transmitters 2a to 2d and received by the antenna 31, and sends them to the controller 33.

The controller (second controller) 33 is configured with a known microcomputer that includes a CPU, a ROM, a RAM, an I/O, and the like, and executes various processes associated with the monitoring of tire pressure in accordance with a program stored in a ROM or the like.

As one process for the monitoring of tire pressure, for example, the controller 33 performs various signal processing and operations based on the data on tire pressure stored in the frames received from the radio wave receiver 32, so as to determine the tire pressure. The controller 33 then outputs an electrical signal in accordance with the determined tire pressure to the indicator 4. For example, the controller 33 compares the determined tire pressure with a predetermined alarm threshold Th, and when the controller 33 detects that the tire pressure has reduced to or below the predetermined alarm threshold Th, the controller 33 outputs a signal indicative of the reduction in tire pressure to the indicator 4.

The controller 33 can also determine the tire pressure of each of the four wheels 5a to 5d and output the tire pressures corresponding to each of the wheels 5a to 5d to the indicator 4. The memory in the controller 33 stores the ID information of the transmitters 2a to 2d disposed in the wheels 5a to 5d in association with the positions of the wheels 5a to 5d. Therefore, the controller 33 can recognize which of the wheels 5a to 5d the transmitter 2a to 2d is attached to, i.e., which of the transmitters the received frame comes from, by checking the ID information stored in the frame, and can thus identify the wheel whose tire pressure has reduced. When a reduction in tire pressure occurs, the wheel with lowered tire pressure is identified based on this procedure, and a signal is output to the indicator 4. It goes without saying that, even when the tire pressure has not reduced, the determined tire pressure may be output to the indicator 4 correspondingly to each of the wheels 5a to 5d.

With this configuration, the information that the tire pressure has reduced in one of the four wheels 5a to 5d, or information that the tire pressure has reduced in each of the four wheels 5a to 5d, is conveyed to the indicator 4.

The indicator 4 is located at a position where the driver can see it as shown in FIG. 1, and configured by an alarm lamp and a display installed inside an instrument panel in the vehicle 1, for example. When the controller 33 in the receiver 3 sends a signal indicative of a drop in the tire pressure, for example, this indicator 4 displays the information to let the driver know that the tire pressure has dropped. Alternatively, when the receiver 3 sends signals corresponding to the respective tire pressures of the four wheels 5a to 5d, the indicator 4 displays the respective tire pressures correspondingly to the wheels 5a to 5d.

The tire pressure detection apparatus according to the present embodiment is configured as described above. Next, the operation of the tire pressure detection apparatus of the present embodiment will be described. Since the operation in the periodic transmission mode is the same as the conventional one as mentioned above, the operation in the running state determination mode will be described.

First, the principle of determining whether the vehicle is at a standstill or running in the running state determination mode will be described.

Also in the present embodiment, a variance value of measured values of acceleration obtained from the detection signals of the acceleration sensor 21b is determined, and it is determined whether the vehicle is at a standstill or running, based on this variance value. The vehicle is determined to be running when the status changes from "standstill" to "running".

The measured values of acceleration are used as mentioned above to determine whether the vehicle is at a standstill or running. The measured values, however, vary because of various factors. More specifically, the following four factors cause variation in the measured values.

(1) There occurs variation in the gravitational acceleration component contained in the measured values due to the difference in position of the transmitters 2a to 2d. More specifically, the detection signals of the acceleration sensors 21b indicate different values of gravitational acceleration depending on the position of the transmitters 2, i.e., above or below the wheel, or on the lateral side, as shown in FIG. 3, so that the gravitational acceleration varies in the range of from −1 G to +1 G.

(2) There occurs variation in measured values because of the measurement errors in the acceleration sensors 21b. More specifically, the measured values vary in the range of ±α depending on the individual variability of the acceleration sensors 21b, temperature drift due to surrounding conditions or heat application, and noise. This variation range of ±α differs depending on the specification and the like of the acceleration sensors 21b.

(3) There occurs variation in measured values because of the acceleration during the running of the vehicle. When the vehicle is running, the measured values of the acceleration sensors 21b include an acceleration caused by the running of the vehicle, i.e., in the present embodiment, the centrifugal acceleration component. Since this acceleration is not constant, it is contained as a variation-causing factor.

(4) There occurs variation in the gravitational acceleration component contained in the measured values due to the changes in the position of the transmitters 2a to 2d during the running of the vehicle. More specifically, as the transmitters 2 move from above the wheel to the lateral side and further to below the wheel as the tires rotate, the gravitational acceleration component of acceleration contained in the measured values varies in the range of from −1 G to +1 G.

The measured values vary as mentioned above because of the four factors. The measured values are not constant and contain large errors even when the vehicle is at a standstill because of the factors (1) and (2) described above. More specifically, there are factors that cause errors in a range of at least ±(1+α) G in addition to the variations during the running. Because of this large variation in the measured values of acceleration, the vehicle cannot be determined to be running at low speed simply by estimating the vehicle speed from a measured value of acceleration. Depending on the size of the tires or wheels, it may not be possible to determine whether the vehicle is running if the speed is not more than 30 km/h.

When attention is directed toward the variation in measured values, the variation in measured values of acceleration is assumed to be larger when the vehicle is running as compared to when it is at a standstill because of the variation-causing factors (3) and (4) in addition to the factors (1) and (2) when the vehicle is at a standstill.

Therefore, the acceleration is measured a desired number of times or more during a time period of one rotation of the tire and a variance value of the measured values of acceleration is determined. A variance threshold is set for determining whether the vehicle is at a standstill or running, so that the external factors when the vehicle is at a standstill can be ignored, and determination as to whether the vehicle is running can be made even at low speed. To enable accurate determination as to whether the vehicle is running based on the variance value of measured values of acceleration, the measurement cycle F of measuring the acceleration needs to be shortened, considering the various factors that cause variation in the measured values of acceleration. However, simply shortening the measurement cycle F will increase the power consumption and is not favorable from the viewpoint of battery life.

Therefore, the measurement cycle F is set in accordance with the running condition of the vehicle so as to reduce power consumption. In this case, as compared to when acceleration is measured with a shorter cycle F of measurement, the reliability of running state determination could be reduced. Therefore, every time it is determined whether the vehicle is running, the number of samples N of acceleration measurements for use in the determination is increased, and if it is still determined that the vehicle is running a predetermined number of times, the accuracy of running state determination is higher, so that it is assumed to be correct and wireless frame transmission is initiated.

Figure 4:
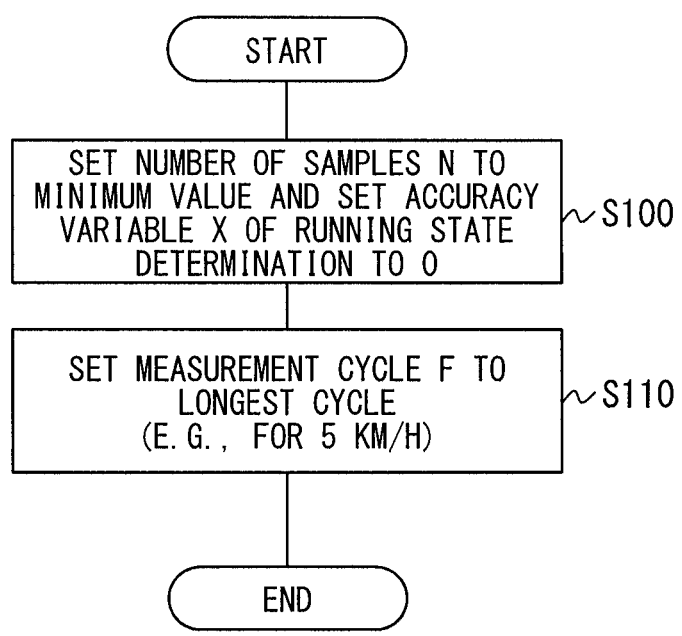
FIG. 4 is a flowchart showing the details of an initial setting process executed by controllers of the transmitters.
Figure 5:
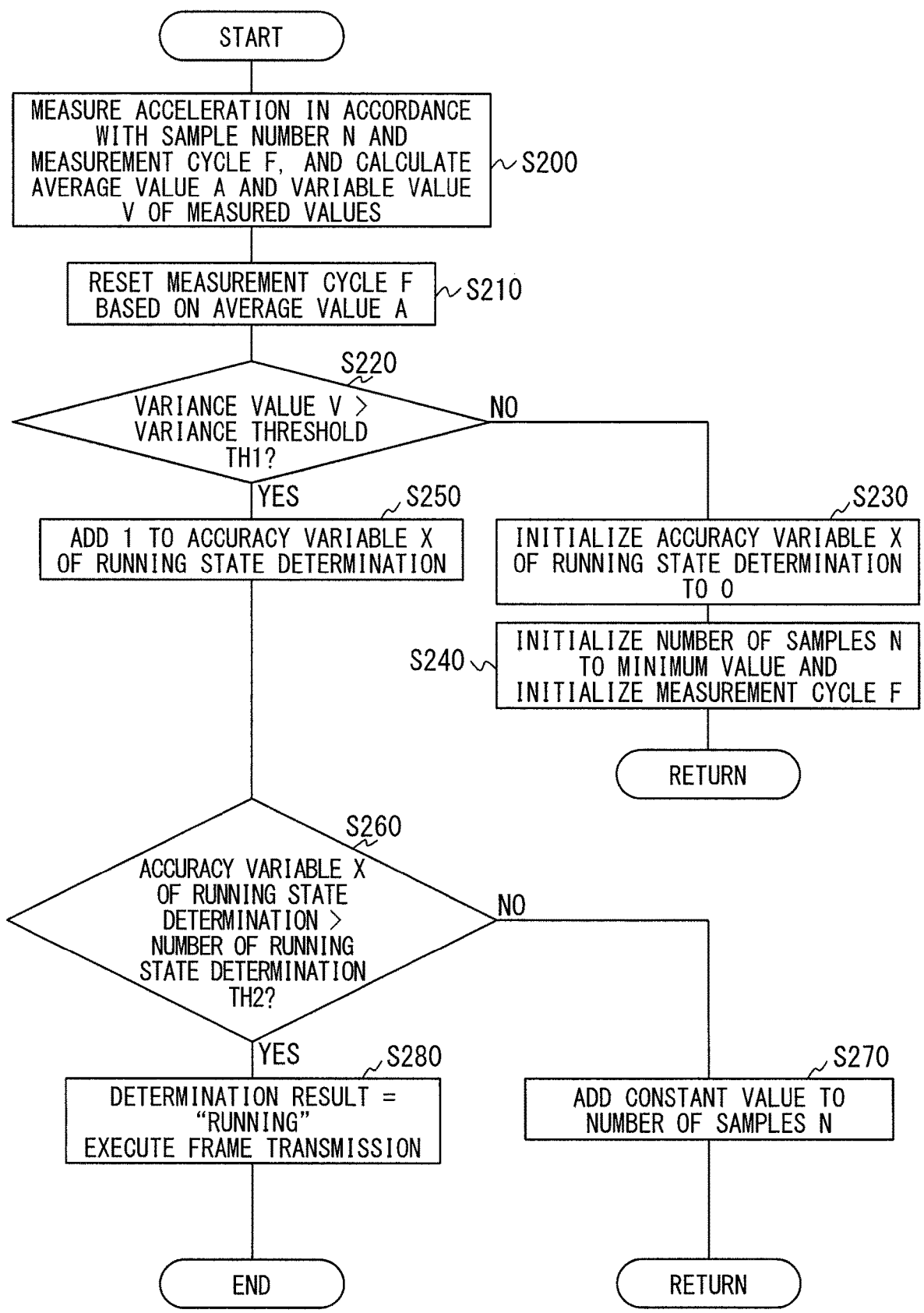
FIG. 5 is a flowchart showing the details of a running state determination process executed by controllers of the transmitters.
Figure 6:
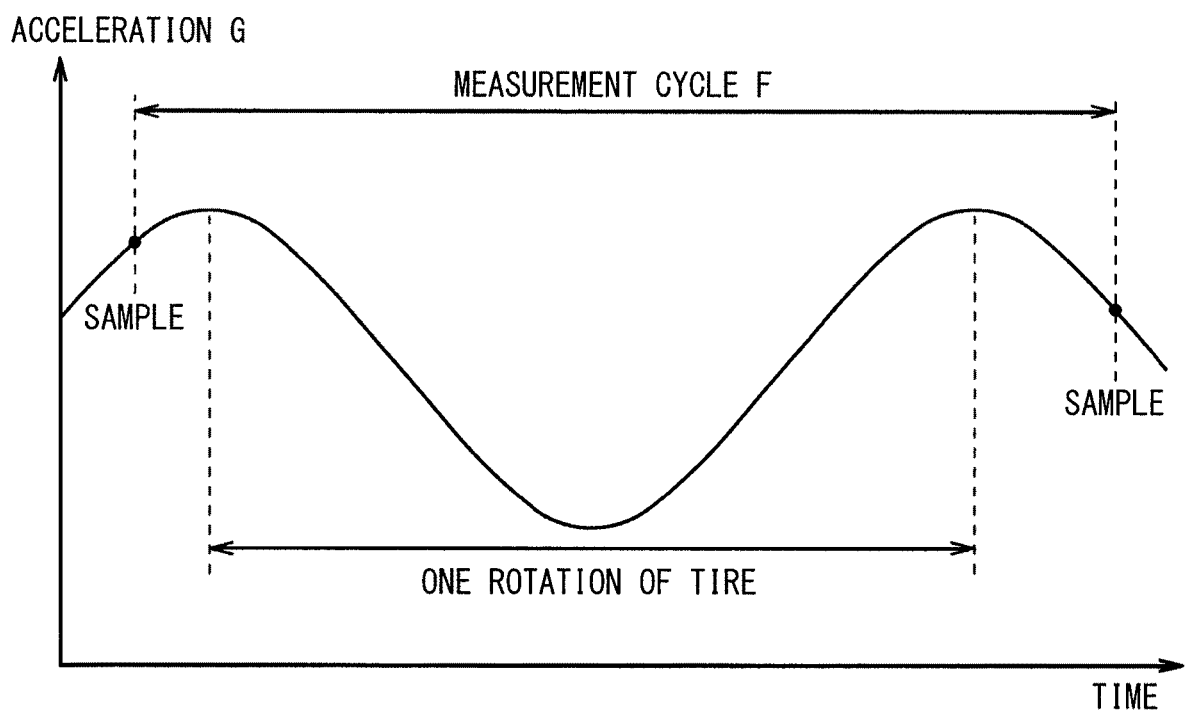
FIG. 6 is a time chart showing one example of the relationship between a rotation cycle of a tire and a measurement cycle.

More specifically, the controller 22 executes the processes of the flowcharts shown in FIG. 4 and FIG. 5 to perform the operation in the running state determination mode.

FIG. 4 and FIG. 5 are flowcharts showing the details of the running state determination process as the running state determination mode, based on the method of determining whether the vehicle is at a standstill or running described above. FIG. 4 shows the initial setting process, and FIG. 5 shows the running state determination process executed after the initial setting process. The process shown in FIG. 4 is carried out once when the transmitters 2a to 2d are turned on, for example, while the process shown in FIG. 5 is repeated for every predetermined control cycle.

In the initial setting process, first, the number of samples N is set to a minimum value, and the accuracy variable X of running state determination is set to zero at S100 shown in FIG. 4.

The number of samples N represents the number of acceleration measurements carried out to make a running state determination. Frame transmission may be initiated instantly when a running state determination is made. However, this running state determination could be issued erroneously. As the number of samples N is greater, the reliability of the running state determination becomes higher. However, because of the dilemma that, as the number of samples N is greater, the power consumption becomes larger, the number of samples N may be set to a relatively small value, and this can cause an erroneous running state determination to be issued. Here, the number of samples N is set to a minimum settable value in consideration of power consumption, because it is assumed that the vehicle is at a standstill at the time when the first determination is made. As will be described later, when the variance value of measured values of acceleration exceeds a variance threshold, the number of samples N is increased so that the running state determination will be made more accurately.

The accuracy variable X of running state determination is a variable that represents the accuracy of a running state determination. In the present embodiment, the number at which the variance value of accelerations to be described later exceeds a variance threshold is used as this variable. As the number at which the variance value of accelerations exceeds a variance threshold is greater, the accuracy variable X of running state determination becomes larger. In the present embodiment, moreover, the number of samples N is increased as this number of times increases, so that the accuracy of running state determination is made even higher.

Next, the process goes to S110, where the measurement cycle F is set to a maximum settable value. As the measurement cycle F is shorter, the accuracy of the running state determination becomes higher, but the power consumption becomes larger. Therefore, the measurement cycle F should preferably be long in terms of battery life. However, if the measurement cycle F is longer than the time required for one rotation of the tire, during which the acceleration varies in the range of ±1 G, this variation cannot be correctly taken into consideration. For example, referring to FIG. 6, if acceleration is measured in one of different periods of the cycle of tire rotation when the transmitters 2a to 2d are similarly positioned relative to the wheels (see FIG. 3), the variance value of measured values will be small. In this case, the variance value V does not exceed the variance threshold, so that the vehicle will be determined to be at a standstill. For this reason, it is preferable to optimize the cycle in accordance with the vehicle speed, i.e., rotation speed of the tire.

Therefore, the measurement cycle F is set such that a desired number of measurement samples can be acquired during a period of one rotation of the tire at a maximum possible vehicle speed at which the tire pressure is to be monitored, so that the variation in the measured values in the range of ±1 G that occurs with the tire rotation can be detected. For example, with the 16-inch tire used as one example, the time for one rotation largely varies from 1550 msec at a vehicle speed of 5 km/h to 39 msec at 200 km/h. In this case, provided that the maximum possible vehicle speed is 200 km/h, a period shorter than 39 msec, which is the time for one rotation of the tire at this speed, is set as the measurement cycle F.

However, because of the dilemma that the power consumption will increase if the measurement cycle F is always short, the cycle F of the first measurement is set to a period corresponding to a minimum possible vehicle speed (e.g., 5 km/h), based on the assumption that the vehicle is at a standstill at the time of the first measurement. The measurement cycle F is then changed in accordance with the running condition of the vehicle thereafter, as will be described later.

Figure 7:
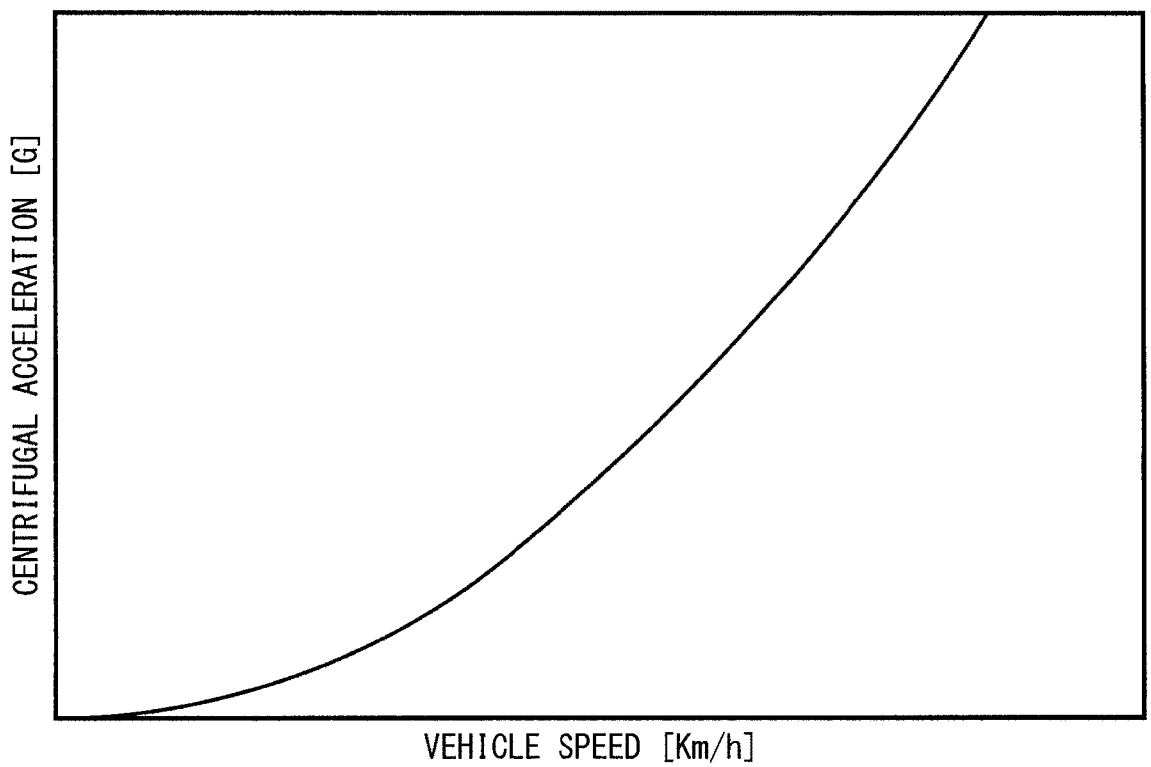
FIG. 7 is a graph showing the relationship between vehicle speed and centrifugal acceleration.

When the initial setting process is complete as described above, the running state determination process shown in FIG. 5 is executed. First, at step S200, acceleration measurements are made, with the number of samples N and the measurement cycle F set in the initial setting process, to calculate an average value A and a variance value V of the accelerations. That is, an acceleration is computed for each measurement cycle F, and when the same number of accelerations as the number of samples N have been collected, an average value A and a variance value V of the collected accelerations are calculated. Since the centrifugal acceleration rises with the increase in the vehicle speed as shown in FIG. 7, the acceleration detected by the acceleration sensors 21b becomes gradually larger in accordance with the vehicle speed.

The process then goes to S210, where the measurement cycle F is reset based on the average value A of the accelerations calculated at S200. The average value A of the accelerations becomes larger as the vehicle runs because the centrifugal acceleration component of the wheels is included in the acceleration. This shows a high probability that the vehicle state has switched to "running". Thus the measurement cycle F is reset to a shorter cycle as the average value A of accelerations increases, on the basis of an assumption that as the average value A of accelerations becomes greater, the expected vehicle speed becomes higher, so that the time for one rotation of the tire will be shorter. With this configuration, the acceleration measurement can be made a desired number of times or more within the time for one rotation of the tire.

After that, the process goes to S220, where it is determined whether the variance value V of accelerations calculated at S210 exceeds a predetermined variance threshold Th1. The variance threshold Th1 is set larger than the variance value V of accelerations when the vehicle is assumed to be at a standstill, and smaller than the variance value V of accelerations when the vehicle is assumed to be running.

When the determination is negative at this step, it means that the vehicle is at a standstill. The process goes to S230, where the accuracy valuable X of running state determination is reset to zero, then to S240 where the number of samples N is reset to a minimum value, and the process ends. When the determination at this step is positive, the vehicle is assumed to be running. A running state determination can be made immediately at this time on the assumption that the vehicle is running. However, the measured values of acceleration include variation as described above, and because the number of samples N is set to a relatively small value and the measurement cycle F is set long, this running state determination is not necessarily highly accurate. Therefore, the following process is performed so that the running state determination can be made more accurately.

First, at S250, 1 is added to the accuracy variable X of running state determination, to indicate that the accuracy of running state determination is increased by one step. At S260, it is determined whether the accuracy variable X of running state determination has exceeded a preset count Th2 of running state determination. The count Th2 of running state determination here refers to an expected count of repeating the running state determination process in order to make an accurate determination of a running state. For example, the number is set such as Th2=5.

When the determination is negative at this step, the process goes to S270, where a constant value is added to the number of samples N, and the process is repeated from S200. With this configuration, each process step is repeated with a higher reliability, since the acceleration is measured and the average value A and variance value V are calculated again based on the number of samples N that has been increased by a constant value from the previous control cycle.

On the other hand, when the determination is positive at this step, which means the vehicle is running, the process goes to S280, where a running state determination is made, and frames storing data on the tire pressure are wirelessly transmitted from the transmitters 2a to 2d. With this configuration, frame transmission from the transmitters 2a to 2d to the receiver 3 can be initiated at the timing when a running state determination is made.

As described above, in the present embodiment, the measurement cycle F of acceleration is set relatively long when the vehicle is at a standstill, and as the possibility that the vehicle is running increases, the measurement cycle F is set relatively short in accordance with an assumed vehicle speed. With this configuration, the measurement cycle F can be optimized in accordance with the vehicle speed, that is, the rotation speed of the tire, so that the variation in the range of ±1 G during the tire rotation can be correctly detected. A running state is detected with a reduced amount of calculation at low speed, while the measurement cycle is shortened at high speed to prevent an erroneous detection of a standstill state, and thus the tire pressure detection apparatus is capable of detecting a running state at low speed while minimizing an increase in power consumption.

Every time a running state determination is made, the number of samples N of acceleration measurements used for the running state determination is increased, so that the running state determination is repeated with increasing reliability. When the running state determination has been made a predetermined count, the accuracy of running state determination is high, so that wireless frame transmission is initiated on the assumption that the running state determination is correct. Thus the running state determination can be made accurately.

More specifically, vehicle speed detection has been difficult at low speed before, because a running state of the vehicle cannot be detected unless the vehicle speed reaches a certain level (e.g., 30 km/h or more) due to limitations such as large measurement errors in the acceleration sensors 21b equipped in the transmitters 2. In contrast, with the tire pressure detection apparatus according to the present embodiment, the vehicle status (standstill or running) can be determined by maximum likelihood estimation from the measurement results obtained by the acceleration sensors 21b based on a time varying probability model in probability theory. Therefore, with the tire pressure detection apparatus according to the present embodiment, a running state detection is possible at low speed even when a precise wheel speed (or standstill/running state) cannot be detected based on the detection signals of the acceleration sensors 21b in the transmitters 2.

Second Embodiment

A second embodiment of the present disclosure will be described. In the present embodiment, the process executed by the controller 22 is changed from the one in the first embodiment, and other features are the same as those of the first embodiment. Therefore the differences from the first embodiment only will be described.

In the first embodiment, the measurement cycle F is set shorter than the period of one rotation of the tire. In the present embodiment, the measurement cycle F is set irrespective of the cycle of one tire rotation, and yet the running state determination is made accurately, even if the measurement cycle F is longer than the period of one rotation of the tire. In the following description, the measurement cycle F will be described as "long", "medium", and "short", to indicate a stepwise reduction in the measurement cycle F. For example, when a measurement cycle F is described as "long", it means that the interval of acceleration measurements is longer than that of a medium-length measurement cycle F, and the number of acceleration measurements (number of samples) per unit time is smaller. Likewise, the variance threshold Th1 compared with a variance value V of measured values of acceleration will be described as small, medium, and maximum, to indicate a stepwise increase in the variance threshold Th1.

First, when the vehicle is at a standstill, it is determined whether the vehicle is still at a standstill or its state has changed to "running", with the use of a long measurement cycle and a small variance threshold, this determination condition being referred to as Phase 1. While the measurement cycle is long, the variance threshold is small, i.e., the variance threshold Th1 is set to a minimum value. Therefore, if the variance value V of measured values of acceleration is not more than this small variance threshold, it can be determined that the vehicle is at a standstill with 100% reliability, and thus the determination that the vehicle is at a standstill cannot be wrong. On the other hand, if the variance value V of measured values of acceleration exceeds the small variance threshold, the reliability is low because the measurement cycle is long. For example, even if the vehicle has been determined to be running, the reliability of this determination may be about 10%, i.e., the determination result may be uncertain and merely indicate a possibility that the vehicle is running.

More specifically, if a running state determination is made in Phase 1, it is possible that the vehicle may be at a standstill, but if the vehicle is determined to be at a standstill, the vehicle is definitely at a standstill. Therefore, if the vehicle is determined to be running in Phase 1, the determination condition is changed to Phase 2. If it is not changed to Phase 2, the vehicle can be considered to be definitely at a standstill. Thus the vehicle can be determined to be at a standstill with a long measurement cycle, and power consumption can be reduced.

In Phase 2, it is determined whether the vehicle is at a standstill or running such that the accuracy of running state determination will be higher than that of Phase 1. More specifically, it is determined whether the vehicle is at a standstill or its state has changed to "running" with the use of a medium-length measurement cycle and a medium variance threshold. While the variance threshold is set to a medium value that is larger than the small variance threshold, the measurement cycle F is set to a medium length, i.e., the measurement interval is shorter than that of the long measurement cycle. Therefore, if the variance value V of measured values of acceleration is not more than this medium variance threshold, it can be determined that the vehicle is at a standstill with 100% reliability. The determination that the vehicle is at a standstill cannot be wrong. On the other hand, if the variance value V of measured values of acceleration exceeds the medium variance threshold, the reliability is still low because the measurement cycle is a medium-length cycle. For example, if the vehicle has been determined to be running, the reliability may be about 50%, i.e., the determination result may be uncertain and merely indicate an increase in the possibility that the vehicle is running.

More specifically, if a running state determination is made in Phase 2, it is also possible that the vehicle may be at a standstill, but if the vehicle is determined to be at a standstill, the vehicle is definitely at a standstill. Therefore, if the vehicle is determined to be running in Phase 2, the determination condition is changed to Phase 3. If it is not changed to Phase 3, the vehicle can be considered to be definitely at a standstill. Thus the vehicle can be determined to be at a standstill with a medium-length measurement cycle, and power consumption can be reduced.

With this method, the determination condition is changed stepwise from Phase 1 to gradually reduce the measurement cycle F and to gradually increase the variance threshold Th1, and it is determined whether the vehicle is at a standstill or running in each phase. This is repeated until Phase Z (Z: a given positive integer) where the measurement cycle F is set to a minimum length (i.e., minimum measurement cycle) and the variance threshold Th1 is set to a maximum value (i.e., maximum variance value). At this time, the variance threshold is highest (i.e., maximum variance threshold) and the measurement cycle is shortest (i.e., minimum measurement cycle). Therefore, if the variance value V of measured values of acceleration is not more than the maximum variance threshold, it can be determined that the vehicle is at a standstill with 100% reliability. The determination that the vehicle is at a standstill cannot be wrong. If the variance value V of measured values of acceleration exceeds the maximum variance threshold, it can be determined that the vehicle is running with a high reliability, e.g., with 100% reliability.

As mentioned above, when it is more likely that the vehicle is running, the measurement cycle F is shortened and variance threshold Th1 is increased for the determination of whether the vehicle is at a standstill or running, so that the running state determination is made with higher reliability. With a shorter measurement cycle F, the acceleration measurement is made more frequently, so that the power consumption is increased. However, the measurement cycle F is shortened only when the vehicle is more likely running. When the possibility is low, the measurement cycle F is made long, so that an increase in power consumption is minimized, and thus the influence on battery life can be limited to bare minimum.

Figure 8:
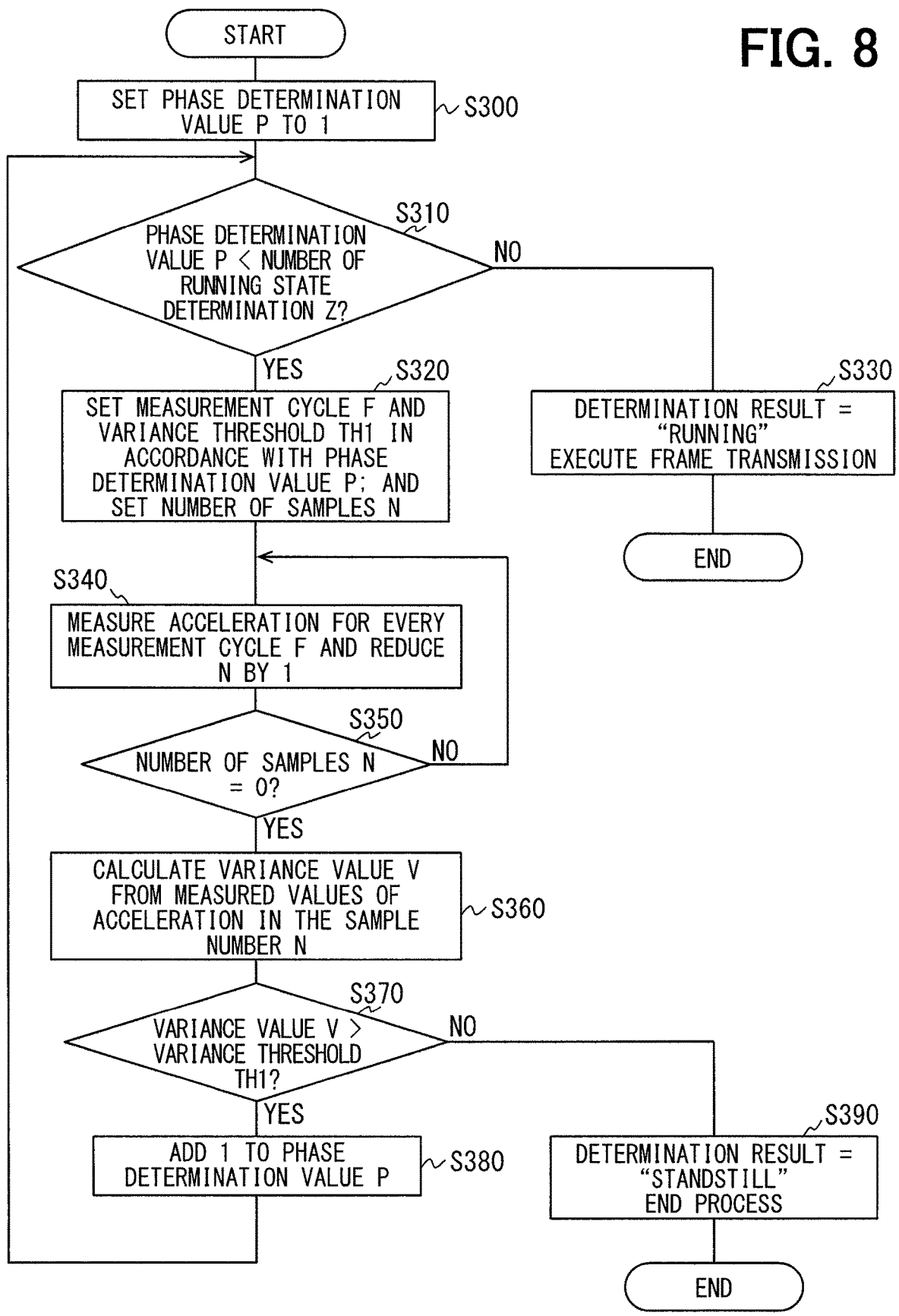
FIG. 8 is a flowchart showing the details of a running state determination process executed by controllers of transmitters equipped in a tire pressure detection apparatus according to a second embodiment of the present disclosure.

More specifically, the controller 22 executes the running state determination process of the flowchart shown in FIG. 8 to perform the operation in the running state determination mode. The process shown in FIG. 8 is repeated for each predetermined control cycle, for example.

First, as an initial setting process, a phase determination value P is set to 1 at S300. The phase determination value P is a value that indicates which of Phase 1 to Phase Z the determination condition is in. Here, the determination condition is initially set as Phase 1, by setting the phase determination value P to 1.

The process goes to S310, where it is determined whether the phase determination value P is less than a count Z of running state determination (i.e., phase determination value P<count Z of running state determination). That is, it is determined whether the running state determination has been made the count until Phase Z is reached. Immediately after the vehicle started running, the phase determination P is 1, so that the determination at S310 is positive and the process goes to S320.

At S320, the measurement cycle F and the variance threshold Th1 are set in accordance with the preset phase determination value P. When the phase determination value P has been set to 1 so that the determination condition is Phase 1, for example, the measurement cycle is set long and the variance threshold is set small. The number of samples N, which is the number of measurements of acceleration, is set to a predetermined fixed value in accordance with the preset phase determination value P.

When the phase determination value P has reached the count of running state determination Z so that the determination at S310 is negative, it can be determined with 100% reliability, for example, that the vehicle is running as described above, so that the process goes to S330 where the determination is made that the vehicle is running. Frames that store data on the tire pressure are wirelessly transmitted.

As mentioned above, the phase determination process is carried out from S310 to S330, wherein the phase determination value P is checked, the measurement cycle F and the variance threshold Th1 are set in accordance with the determination condition based on this phase determination value P, and if Phase Z has been reached (i.e., phase determination value P=Phase Z), the vehicle is determined as running. When it is determined that Phase Z has not been reached yet in this phase determination process, the process goes to S340, while, when Phase Z has been reached, frame transmission is carried out at S330, and the process ends.

At S340, the acceleration measurement is carried out at every cycle N of measurement set at S320, after which the number of samples N set at S320 is reduced by 1. The process goes to S350 thereafter, where it is determined whether the number of samples N has reached 0, and the step S340 is repeated until it reaches 0. More specifically, measured values of acceleration are collected until the count of acceleration measurement reaches the number of samples N.

When the determination at S350 is positive, the process goes to S360, where a variance value V of measured values of acceleration in the number of samples N is calculated, after which the process goes to S370 where it is determined whether the variance value V exceeds the variance threshold Th1. More specifically, it is determined whether the vehicle can be determined as running in the determination condition of the currently set phase determination value P. When the determination at this step is positive, i.e., when the vehicle is determined to be running, the process goes to S380 where 1 is added to the phase determination value P, and the process steps from S310 onward are repeated. When the determination at this step is negative, i.e., when the vehicle is not determined to be running, it is determined to be at a standstill, and the process is ended.

Thus the process of making a running state determination according to the present embodiment is complete. As described above, the determination condition for making a determination whether the vehicle is at a standstill or running is changed stepwise from one phase to another, while the phase remains unchanged when the vehicle is definitely at a standstill so that the measurement cycle F remains long. Only when there is a possibility that the vehicle may be running, the phase is changed to reduce the measurement cycle F, until a condition that indicates that the vehicle is definitely running is detected, to make the running state determination. Therefore, the measurement cycle F can be made long unless there is a possibility that the vehicle is running, so that an increase in power consumption can be minimized and the influence on battery life can be limited to bare minimum.

In the present embodiment, frame transmission is carried out only when the phase determination value P reaches Z and the reliability of the running state determination is as high as 100%, for example. Thus, as compared to when frame transmission is carried out every time a running state determination is made in each phase irrespective of the reliability, an increase in power consumption can be minimized more and the battery life can be increased.

With the running state determination process described above, once the frame transmission is carried out, it is assumed that the running state will continue. Therefore, it is preferable to set the measurement cycle F back to a relatively long value and to stop frame transmission until the vehicle state becomes "standstill" again and then switches to "running". With this configuration, repeated frame transmission will be prevented, as would if the determination condition remains Phase Z during the running of the vehicle, so that an increase in power consumption can be minimized.

For example, when a frame transmission is carried out based on a running state determination, the determination condition is returned to Phase 1 and remained at Phase 1 so that only Phase 1 is repeated. The process steps from S310 onward are executed again on condition that the vehicle is determined to be at a standstill based on an acceleration measurement result in Phase 1.

Figure 9:
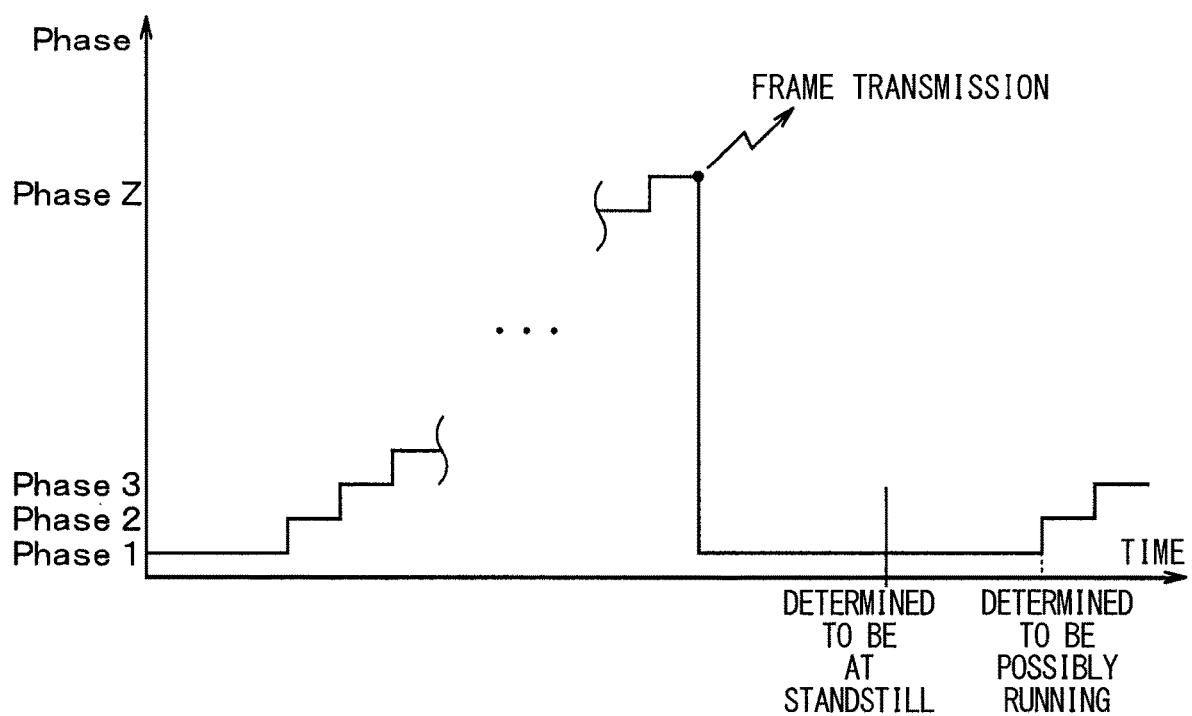
FIG. 9 is a diagram showing an example of a time chart when the running state determination process described in the second embodiment is executed.

In this case, as shown in the time chart of FIG. 9, the phase determination value P is gradually increased from 1 when there is a possibility that the vehicle is running, so that it is determined whether the vehicle is running or at a standstill stepwise from Phase 1 to Phase Z. When it is definitely determined with 100% reliability, for example, that the vehicle is running in Phase Z, the frame transmission is carried out, after which the phase is returned to Phase 1. When the vehicle is determined to be at a standstill in Phase 1, this constitutes a condition subsequent to allow change of the phase determination value P, so that the phase determination value P will be gradually increased every time it is determined that the vehicle is likely running, repeatedly thereafter.

With this configuration, after a running state determination has been made and a frame transmission has been carried out, repeated measurement of acceleration with a relatively short measurement cycle will be stopped, and repeated frame transmission other than the periodic transmission due to the repeated running state determination will be prevented. Also, when the phase is returned to Phase 1 after the frame transmission, a phase change caused by an immediate determination of a running state can be prevented. Thus, repeated frame transmission can be prevented, so that an increase in power consumption can be minimized.

More specifically, with the tire pressure detection apparatus according to the present embodiment, the vehicle status (standstill or running) is determined by maximum likelihood estimation from the measurement results obtained by the acceleration sensors 21*b* based on a time varying probability model in probability theory. Therefore, with the tire pressure detection apparatus according to the present embodiment, too, a running state detection is possible at low speed even when a precise wheel speed (or standstill/running state) cannot be detected based on the detection signals of the acceleration sensors 21*b* in the transmitters 2.

Other Embodiments

In the first embodiment, for example, the measurement cycle F is set to a maximum value in the initial setting process on an assumption that the vehicle is at a standstill when the acceleration is measured the first time, and the measurement cycle F is changed in accordance with the running condition after that. Instead, the measurement cycle F may be set to a shortest cycle when the acceleration is measured the first time, and extended every time the number of trial of acceleration measurement increases, so that the measurement cycle F is changed gradually in accordance with the running condition. Alternatively, the measurement cycle F may be set correspondingly to a vehicle speed, which can be estimated from measured values of acceleration obtained from previous acceleration measurements. The measurement cycle F is changed in accordance with the running condition based on measured values of acceleration, more specifically, an average value A of the measured values. This means that the measurement cycle F is shortened in accordance with an increase in vehicle speed, because an increase in the average value A of measured values indicates a higher possibility that the vehicle state has switched to "running". The change of the measurement cycle need not necessarily be based on the average value A of measured values.

In the first and second embodiments, the count of frame transmission may be reduced in consideration of traffic congestions. More specifically, in a traffic congestion, the vehicle repeatedly stops and goes, so that, if frames are transmitted every time a running state determination is made, such frequent frame transmission will increase power consumption and cause a reduction in battery life. Therefore, the variation cycle of measured values of acceleration may be analyzed using a discrete Fourier transform or the like, to determine the cycle of variation of the measured values in the range of ±1 G with the running of the vehicle, and the frequency of frame transmission may be reduced when a low-speed running state (e.g., 30 km/h or lower) is detected. Frame transmission may be carried out once every several times of running state determination, for example. Alternatively, a low-speed running state can be detected by estimating the current vehicle speed from an average value A of measured values of acceleration. By evaluating a vehicle speed from an average value A of measured values of acceleration, the amount of calculation can be reduced as compared to an analysis with the use of a discrete Fourier transform or the like, so that power consumption in the controller 22 can be reduced.

In the first embodiment, the transmitters 2*a* to 2*d* and the receiver 3 may perform bidirectional communication. In this case, if an on/off signal of the car engine is available on the receiver 3 side from an electronic controller (not shown) or the like provided for controlling meters, this signal may be transmitted to the transmitters 2*a* to 2*d*, and preferably, a process for enhancing reliability may be carried out, assuming that when the engine is on, the vehicle is likely running. More specifically, the measurement cycle F may be set short, for example, to a shortest settable cycle, or the number of samples N may be set large, for example, to a maximum settable value. Conversely, the operation in the running state determination mode may be stopped when the engine is off, because there is no possibility that the vehicle is running.

In the second embodiment, the number of samples N is a fixed value. With the measurement cycle F varied to long, medium, and short, the time required for obtaining the same number of samples N will differ. Instead, the number of samples N may be set freely, and the time required for obtaining a number of samples N may be made the same. For example, the number of samples N may be changed in accordance with the measurement cycle F such that the shorter the measurement cycle F, the larger the number of samples N.

The steps shown in the drawings correspond to devices that execute the various processes. That is, the section that executes the process of S200 corresponds to a computing device, the section that executes the process of S210 corresponds to a measurement cycle setting device, and the section that executes the process of S220 corresponds to a running state determination device. The section that executes the process of S250 corresponds to an accuracy setting device, the section that executes the process of S260 corresponds to an accuracy determination device, the section that executes the process of S270 corresponds to an adding device, and the section that executes the process of S280 corresponds to a transmission device. The section that executes the process of S320 corresponds to a setting device, the section that executes the process of S330 corresponds to a transmission device, the section that executes the process of S360 corresponds to a computing device, and the section that executes the process of S370 corresponds to a running state determination device.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A tire pressure detection apparatus comprising:
a transmitter arranged at each of a plurality of wheels with a tire, including
a sensing device having a pressure sensor, which outputs a detection signal related to a tire pressure of each of the plurality of wheels and an acceleration sensor, which detects an acceleration including a centrifugal acceleration caused by rotation of the wheel and a gravitational acceleration,
a first controller that performs signal processing on the detection signal of the pressure sensor and creates a frame, which stores data related to the tire pressure, and
a radio wave transmitter that transmits the frame; and
a receiver arranged at a vehicle body, including
a radio wave receiver that receives the frame, and
a second controller that detects a tire pressure based on the data related to the tire pressure stored in the received frame,
wherein the first controller is configured to:
measure the acceleration at a measurement cycle, which is set at a predetermined value, based on the detection signal of the acceleration sensor to compute measured values, and calculate a variance value of the measured values;
shorten the measurement cycle as a vehicle speed, based on the measured values, increases;
carry out a running state determination to determine that the vehicle is running when the variance value of the measured values of the acceleration exceeds a variance threshold set at a predetermined value; and
set a running state determination accuracy variable representing an accuracy of the running state determination;
increase the running state determination accuracy variable representing the accuracy of the running state determination in response to determining that, after shortening the measurement cycle, the variance value of the measured values of the acceleration measured at the shortened measurement cycle still exceeds the variance threshold;
determine whether the running state determination accuracy variable exceeds a predetermined running state determination count; and
carry out a frame transmission from the radio wave transmitter in response to determining that the running state determination accuracy variable exceeds the predetermined running state determination count after shortening the measurement cycle.

2. The tire pressure detection apparatus according to claim 1,
wherein the first controller is further configured to:
calculate an average value of a predetermined number of samples of the measured values of the acceleration collected at the measurement cycle; and
shorten the measurement cycle when the vehicle speed increases as the average value increases.

3. The tire pressure detection apparatus according to claim 2:
wherein the first controller is configured to:
add a value to the number of samples when the variance value of the measured values does not exceed the variance threshold so as to increase the number of samples with which the average value is calculated by the first controller.

4. A tire pressure detection apparatus comprising:
a transmitter arranged at each of a plurality of wheels with a tire, including
a sensing device having a pressure sensor, which outputs a detection signal related to a tire pressure of each of the plurality of wheels, and an acceleration sensor, which detects an acceleration including a centrifugal acceleration caused by rotation of the wheel and a gravitational acceleration,
a first controller that performs signal processing on the detection signal of the pressure sensor and creates a frame, which stores data related to the tire pressure, and
a radio wave transmitter that transmits the frame; and
a receiver arranged at a vehicle body, including
a radio wave receiver that receives the frame, and
a second controller that detects a tire pressure based on the data related to the tire pressure stored in the received frame,
wherein the first controller is configured to:
set a measurement cycle for measuring the acceleration based on the detection signal of the acceleration sensor, and set a variance threshold to be compared with a variance value of the measured values of acceleration,
calculate a variance value of the measured values of acceleration measured at the measurement cycle,
carry out a running state determination to determine whether the vehicle is at a standstill or running by determining whether the variance value exceeds the variance threshold and to determine that the vehicle is running when the variance value of the measured values of the acceleration exceeds the variance threshold, and
initiate a frame transmission from the radio wave transmitter when the running state determination is carried out; and
shorten the measurement cycle and enlarge the variance threshold in response to determining that the variance value exceeds the variance threshold and that the vehicle is running.

5. The tire pressure detection apparatus according to claim 4, wherein:
wherein the first controller is further configured to:
shorten the measurement cycle and enlarge the variance threshold to and repeats resetting of the measurement cycle and the variance threshold until the variance threshold reaches to a maximum variance threshold value, in response to determining that the variance value exceeds the variance threshold and that the vehicle is running; and
initiate the frame transmission, in response to determining that the vehicle is running because the variance value exceeds the maximum variance threshold value.

6. The tire pressure detection apparatus according to claim 5,
wherein the first controller is further configured to:
set the measurement cycle to a longest cycle and sets the variance threshold to a minimum variance threshold value, in response to determining that the variance value is less than or equal to the maximum variance threshold value and that the vehicle is at a standstill;

reset the measurement cycle to the longest cycle and reset the variance threshold from the maximum variance threshold value to the minimum variance threshold value, in response to carrying out the frame transmission; and maintain the longest measurement cycle and the minimum variance threshold value until the variance value calculated by the first controller is reduced to a value less than or equal to the minimum variance threshold value and the vehicle is determined to be at a standstill, after the first controller setting the measurement cycle to the longest measurement cycle and setting the variance threshold to the minimum variance threshold value.

7. A tire pressure detection apparatus comprising:

a transmitter arranged at each of a plurality of wheels with a tire, including a sensing device having a pressure sensor, which outputs a detection signal related to a tire pressure of each of the plurality of wheels and an acceleration sensor, which detects an acceleration including a centrifugal acceleration caused by rotation of the wheel and a gravitational acceleration, a first controller that performs signal processing on the detection signal of the pressure sensor and creates a frame, which stores data related to the tire pressure, and a radio wave transmitter that transmits the frame; and a receiver arranged at a vehicle body, including a radio wave receiver that receives the frame, and a second controller that detects a tire pressure based on the data related to the tire pressure stored in the received frame, wherein the first controller is configured to:

measure the acceleration at a measurement cycle, which is set at a predetermined value, based on the detection signal of the acceleration sensor to compute measured values, and calculate a variance value of the measured values;

carry out a running state determination to determine that the vehicle is running when the variance value of the measured values of the acceleration exceeds a variance threshold set at a predetermined value;

calculate an average value of a predetermined number of samples of the measured values of the acceleration collected at the measurement cycle;

shorten the measurement cycle when the vehicle speed increases and the average value increases;

set a running state determination accuracy variable that represents accuracy of the running state determination;

add a value to the number of samples so as to increase the number of samples with which the average value is calculated;

increase the running state determination accuracy variable representing the accuracy of the running state determination in response to determining that, after shortening the measurement cycle, the variance value of the measured values of the acceleration measured at the shortened measurement cycle still exceeds the variance threshold;

determine whether the running state determination accuracy variable exceeds a predetermined running state determination count; and carry out a frame transmission from the radio wave transmitter in response to determining that the running state determination accuracy variable exceeds the predetermined running state determination count after shortening the measurement cycle.

\* \* \* \* \*